Oct. 18, 1932.                A. GELLERT                1,883,365
                             HYDRAULIC CLUTCH
                         Filed May 27, 1931        2 Sheets-Sheet 1
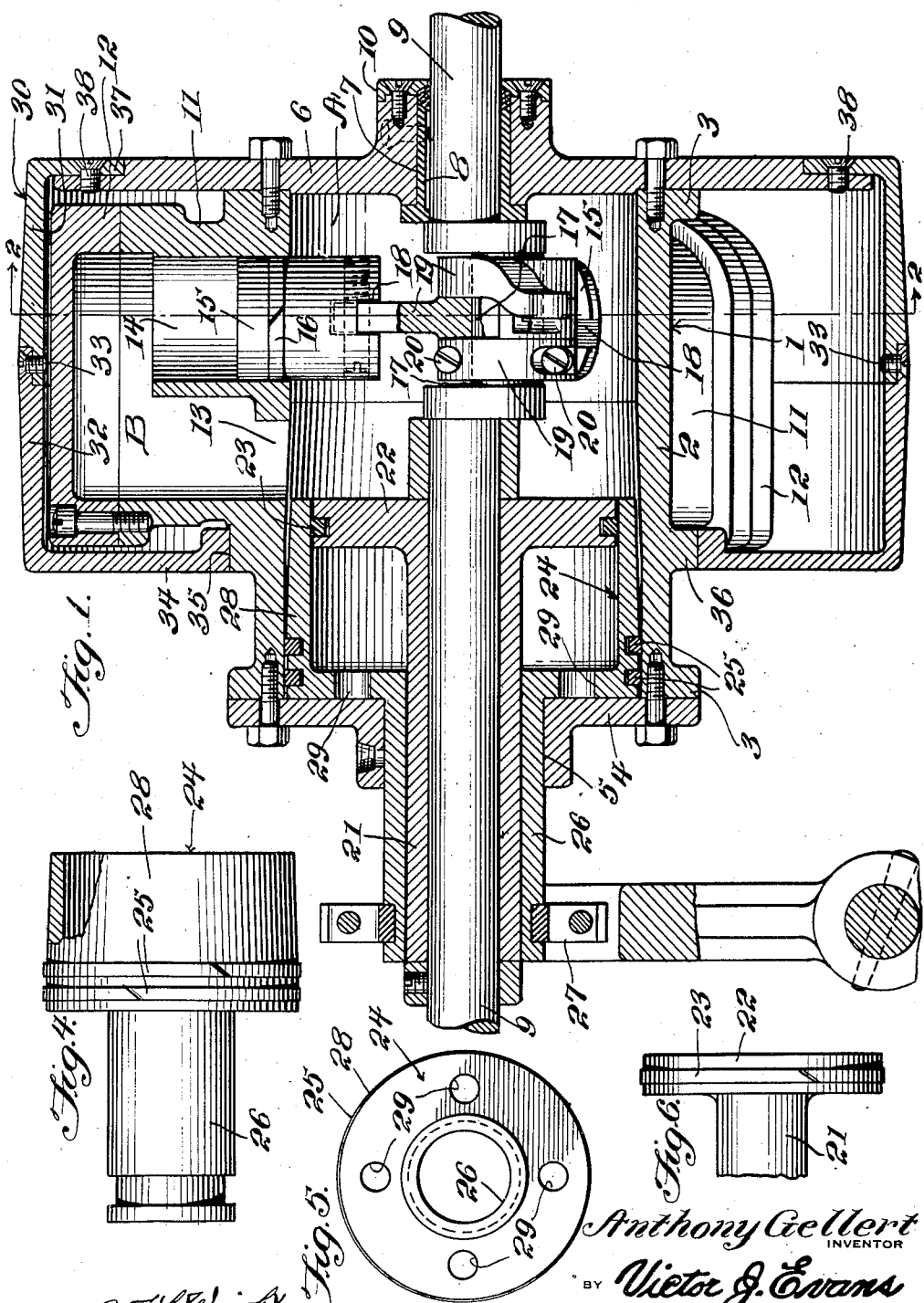

Oct. 18, 1932.    A. GELLERT    1,883,365
HYDRAULIC CLUTCH
Filed May 27, 1931    2 Sheets-Sheet 2
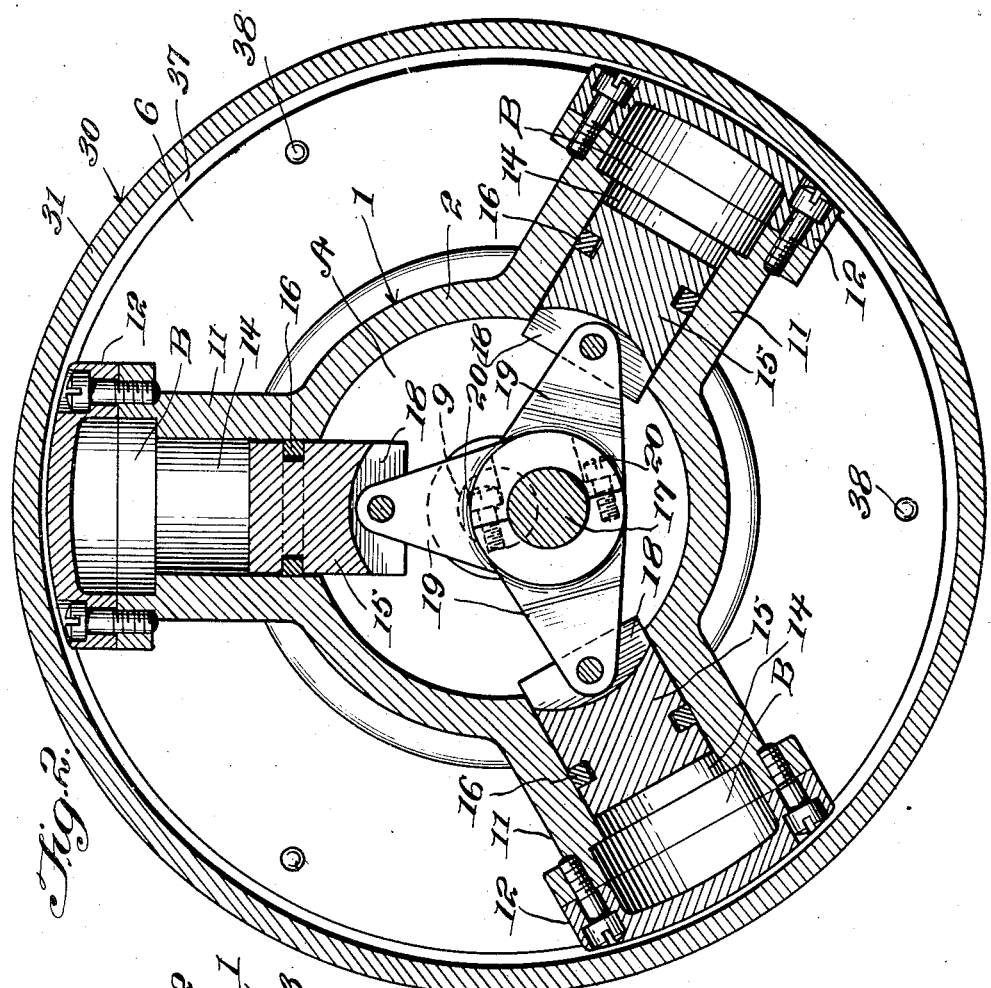
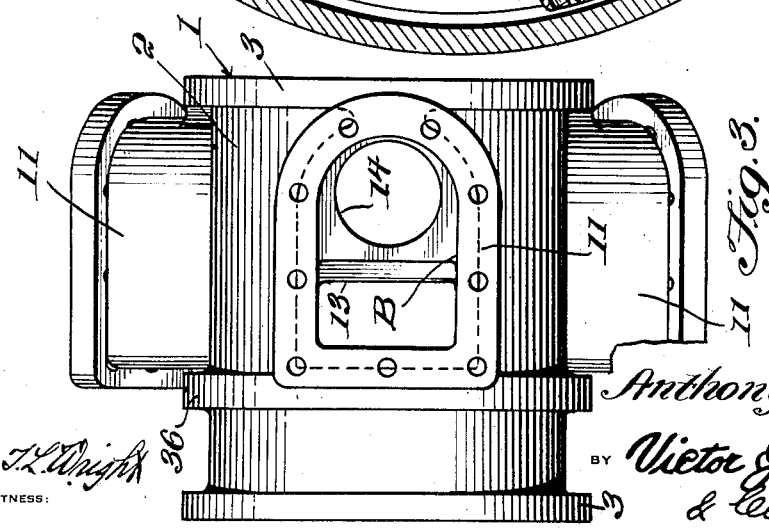
Anthony Gellert
INVENTOR
BY Victor J. Evans & Co.
ATTORNEYS Patented Oct. 18, 1932

1,883,365

UNITED STATES PATENT OFFICE

ANTHONY GELLERT, OF BROOKLYN, NEW YORK

HYDRAULIC CLUTCH

Application filed May 27, 1931. Serial No. 540,415.

This invention relates to hydraulic clutches especially adapted for operation between a power medium and a driven device and has for the primary object, the provision of a device of the above stated character which will be positive in operation and consist of few parts for assuring economical operation and low cost of manufacture and which will be durable and efficient for use wherever it is desired to connect and disconnect two rotating devices, whereby one device may be driven from the other device with smoothness and quietness.

With this and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a vertical sectional view illustrating a hydraulic clutch constructed in accordance with my invention.

Figure 2 is a transverse sectional view taken on the line 2—2 of Figure 1.

Figure 3 is a side elevation illustrating a driving member with cylinders and chambers carried thereby.

Figure 4 is a side elevation partly broken away illustrating a control valve.

Figure 5 is an end view of a control valve.

Figure 6 is a fragmentary side elevation illustrating a non-movable piston or head.

Referring in detail to the drawings, the numeral 1 indicates a drive member including a cylindrical body 2 having marginal flanges 3 at the ends thereof and one end of the body 2 has detachably secured thereto an end plate 4 provided with a centrally located bearing opening 5. The other end of the body 2 is closed by a removable plate 6 which projects beyond the outer face of the body and is provided with a centrally located bearing opening 7 disposed in alignment with the bearing opening 5 and has mounted therein a bearing sleeve 8 to rotatably support one end of a crank shaft 9 that extends through the drive member and the bearing opening 5 of the end plate 4. The interior of the drive member 1 forms a main fluid chamber A and the bearing opening 7 has associated therewith a suitable stuffing box 10 to prevent the escape of fluid from the chamber A about the crank shaft 9.

Walls 11 are formed integral with the body 2 of the drive member 1 to form a plurality of radially arranged chambers B and the outer edges of the walls 11 are flanged to be engaged by removable heads 12 for closing the chambers B and said chambers are in communication with the main chamber A by ports 13. Cylinders 14 are formed integral with the walls 11 within the chambers 13 and also communicate with said chambers B and the main chamber A and have slidably mounted therein pistons 15 provided with rings 16. The pistons 15 are arranged radially about the crank 17 of the crank shaft 9 and have their inner ends cut away to form recesses 18 in which are pivotally mounted the outer ends of connecting rods 19. The inner ends of the connecting rods are mounted on the crank 17 and by referring to Figure 1 it will be noted that the inner ends of the connecting rods are of the sectional bearing type detachably connected by stud bolts 20 to permit the inner ends of the connecting rods to be assembled on the crank 17 laterally of each other and permits adjustment of the connecting rods on the crank to compensate for wear.

A sleeve 21 is secured to the crank shaft 9 and extends into the chamber A by way of the bearing opening 5 of the end plate 4 and has formed integral with the inner end thereof a non-slidable piston or head 22 provided with an expansion or packing ring 23 that contacts with a control valve 24. The control valve is in the form of a piston having rings 25 to engage the inner walls of the drive member 1 and said valve has formed integral therewith a sleeve 26 slidably received in the bearing opening 5 and surrounds the sleeve 21 and is grooved to receive a suitable operating lever or mechanism 27 whereby the valve 24 may be slid in opposite directions within the drive member. The sleeve 26 of the valve 24 has a comparatively tight fit with the sleeve 21 and the bearing opening 5 to prevent leakage from the chamber A. The valve 24 being substantially of a piston construction provides a skirt portion 28 which is tapered toward its free edge as shown in Figure 1 with the non-slidable head 22 and its ring 23 engaging the inner wall of the skirt. The head of the valve is provided with a plurality of openings 29 to permit air trapped between the end plate 4 and the valve to pass through said valve during the movement thereof and thereby reduce to a minimum the resistance of the air against said valve.

A power medium (not shown) may be coupled to the end plate 6 in any suitable way for the purpose of imparting rotation to the member 1 or a pulley casing 30 is provided over which may be trained a power belt for imparting rotation to the drive member 1. The pulley casing 30 is constructed from sections 31 and 32 having their adjacent edges arranged in overlapped relation and detachably connected by fasteners 33. The section 32 includes an end wall 34 provided with a bearing opening 35 resting tightly against an annular bearing or shoulder 36 formed integral with the outer face of the drive member 1. The section 31 includes an end wall or flange 37 arranged in overlapped relation with the end plate 6 and detachably secured thereto by fasteners 38; thus it will be seen that the pulley casing can be easily removed from the drive member 1 when desiring to remove the heads 12 for gaining access to the interior of the chambers 13 and cylinders 14.

In operation the chambers A and B are substantially filled with a suitable fluid and with power delivered to the drive member 1 and a resistance on the crank shaft 9 and with the valve 24 positioned to fully open the ports 13, the drive member may be rotated free of the crank shaft. With the valve 24 positioned to close the ports the fluid within the chambers B will be prevented from flowing into the chamber A and vice versa and the resistance of the fluid against the pistons will cause rotation of the crank shaft with the rotation of the drive member 1. By varying the size of the ports 13 through the adjustment of the valve 24 the flow of fluid through said ports may be varied for the purpose of varying the rotation of the crank shaft relative to the drive member 1, or in other words, a reduction of speed of rotation of the crank shaft may be had over the speed of rotation of the drive member 1, thus providing a device capable of transmitting variable speeds between the power medium and the driven device.

While I have shown and described the preferred embodiment of my invention, it will be understood that minor changes in construction, combination and arrangement of parts may be made without departing from the spirit and scope of my invention, as claimed.

Having thus described my invention, what I claim is:

A hydraulic clutch comprising a drive member adapted for connection to a power medium and having a main fluid chamber, a crank shaft journalled in said drive member and adapted to be connected to a device to be driven, radially extending members on the drive member and forming auxiliary chambers, said drive member having ports between the chambers, cylinders carried by the radially extending members and the drive member and in communication with the chamber, pistons slidable in the cylinders and connected to the crank shaft, a non-slidable head in the main chamber, a sleeve valve between the head and the walls of the main chamber for controlling the ports, and means for varying the position of the valve relative to the ports.

In testimony whereof I affix my signature.

ANTHONY GELLERT.